United States Patent [19]

Kohn

[11] Patent Number: 4,746,473

[45] Date of Patent: May 24, 1988

[54] ULTRATHIN BLENDED CELLULOSE NITRATE POLYMER FILMS AND THEIR PREPARATION

[75] Inventor: Rachel S. Kohn, Springfield, N.J.

[73] Assignee: Hoechst Celanese Corporation, Somerville, N.J.

[21] Appl. No.: 917,425

[22] Filed: Oct. 10, 1986

[51] Int. Cl.[4] .............................................. B29C 41/12
[52] U.S. Cl. .......................................... 264/41; 55/16; 210/500.29; 264/298; 264/331.11; 428/220; 106/183
[58] Field of Search ................... 428/220; 264/298, 41, 264/331.11, 331.18; 106/183

[56] References Cited

U.S. PATENT DOCUMENTS

| | | | |
|---|---|---|---|
| 3,551,244 | 12/1970 | Forester et al. | 264/298 |
| 4,155,793 | 5/1979 | Salemme et al. | 264/298 |
| 4,279,855 | 7/1981 | Ward, III | 264/298 |
| 4,556,530 | 12/1985 | van der Scheer et al. | 264/298 |

*Primary Examiner*—Allan M. Lieberman
*Attorney, Agent, or Firm*—Lynch, Cox, Gilman & Mahan

[57] ABSTRACT

Disclosed herein are free-standing, pinhole-free, ultrathin, blended, cellulose nitrate films having thicknesses of about 400 angstroms or less and a process to prepare them. The films find particular utility in separatory applications.

15 Claims, No Drawings

ULTRATHIN BLENDED CELLULOSE NITRATE POLYMER FILMS AND THEIR PREPARATION

STATEMENT AS TO RIGHTS TO INVENTIONS MADE UNDER FEDERALLY SPONSORED RESEARCH AND DEVELOPMENT

This invention was made with Government support under Contract Number DAAK 20-84-C-0147 awarded by the Department of Defense (DOD). The Government has certain rights in this invention.

BACKGROUND OF INVENTION

1. Field of Invention

This invention relates to polymer films. More particularly, this invention relates to ultrathin, blended, cellulose nitrate polymer films and their production.

2. Prior Art

The preparation of cellulose nitrate or methacrylate polymer films on a liquid support, such as water, is known. See for example, U.S. Pat. Nos. 2,537,969, 2,537,970, and 2,607,081. Such patents, however, do not discloses the mixing of cellulose nitrate and methacrylate polymers to form blended polymer films.

U.S. Pat. No. 2,689,187 discloses a process for preparing nitrocellulose films. The films allegedly have thicknesses between 200 and 2,000 angstroms. However, the mixing of other polymers, such as methacrylate polymers, to form blended cellulose nitrate films is not disclosed.

In U.S. Pat. No. 2,760,233, a process is disclosed for preparing curved polymer sheets from methacrylic acid ester polymers. However, the addition of cellulose nitrate is not disclosed nor are specific solvent mixtures and ratios suitable for casting ultrathin, pinhole-free, blended, cellulose nitrate films disclosed nor are any film thicknesses provided.

U.S. Pat No. 3,551,244 discloses a process for preparing on a water surface films having a thickness between 0.05 and 5.0 microns (i.e. between 500 and 50,000 angstroms). The patent discloses that some esters, such as ethyl acetate, are suitable casting solvents and states the polymethylmethacrylate and cellulose nitrate films can be prepared. However, the mixing of polymethylmethacrylate and cellulose nitrate is not disclosed nor are specific solvent mixtures and ratios suitable for casting pinhole-free, blended, cellulose nitrate films having thicknesses less than 400 angstroms.

U.S. Pat. No. 3,767,737 discloses a method for producing on a support liquid nonporous alkyl methacrylate polymer membranes having thicknesses between 0.005 and 0.05 mils. Nevertheless, cellulose nitrate is not disclosed as a polymer suitable for combining with alkyl methacrylate polymers to form blended cellulose nitrate films. In addition, specific mixtures of solvents and appropriate solvent ratios for preparing pinhole-free, blended cellulose nitrate films having thicknesses of 400 angstroms or less are not disclosed.

U.S. Pat. Nos. 4,155,793, 4,279,855 and 4,374,891 disclose processes for preparing substantially void-free, ultrathin, permeable polymeric membranes having thicknesses of 500 angstroms or less. Alkyl acrylate polymers are allegedly suitable for use in the disclosed process. However, only films prepared from organopolysiloxane-polycarbonate interpolymers mixed with polyphenylene oxide are disclosed in the examples. Cellulose nitrate films are not disclosed nor are suitable solvent mixtures and ratios for casting blended cellulose nitrate films having thicknesses of 400 angstroms or less described.

In U.S. Pat. No. 3,933,561, a process for preparing polymer membranes is disclosed. Cellulosic polymers are alleged to be suitable for use in the process. However, the blending of nitrocellulose with methacrylate polymers is not disclosed nor are suitable solvent mixtures and ratios for casting blended cellulose nitrate films having thicknesses of 400 angstroms or less.

Other patents, such as U.S. Pat. Nos. 2,631,334 and 4,393,113, also disclose ultrathin polymeric films. However, no blended cellulose nitrate films are disclosed.

In the prior art, the preparation of ultrathin, pinhole-free, blended, cellulose nitrate, free-standing films having thicknesses of less than 400 angstroms generally has not been disclosed. Usually, prior art polymer films with thicknesses of less than 400 angstroms that are cast contain voids or other macroscopic defects.

Therefore, it is an object of this invention to prepare ultrathin, blended cellulose nitrate polymer films.

It is a further object of this invention to prepare pinhole-free, blended, cellulose nitrate polymeric films.

It is also an object of this invention to prepare blended, cellulose nitrate films having thicknesses of 400 angstroms or less.

These and other objects are obtained by the products and process of the present invention.

SUMMARY OF INVENTION

The instant invention provides a process for preparing macroscopically pinhole-free, ultrathin, blended, cellulose nitrate films having thicknesses of about 400 angstroms or less. The films are prepared by dissolving a cellulose nitrate polymer and a methacrylate polymer in a suitable mixture of alkyl acetates to form a polymeric solution, casting the solution on water to form a free-standing film, and removing the film from the water. The ultrathin films of the present invention can be used in separatory applications and as drug release membranes for the controlled release of drugs.

DETAILED DESCRIPTION OF INVENTION

The preparation of the cellulose nitrate and of the methacrylate polymers that can be blended to form films is well known.

The cellulose nitrate polymers suitable for use in the present invention preferably have molecular weights, $M_w$, greater than about 50,000 and most preferably greater than about 200,000.

The methacrylate polymers suitable for use in the present invention preferably have molecular weights, $M_w$, greater than about 50,000 and most preferably greater than about 80,000.

A variety of methacrylate polymers can be mixed with cellulose nitrate to form the ultrathin films of this invention. In general, the preferred methacrylate polymers are the $C_1$ to $C_8$ alkyl methacrylates, preferably poly n-butylmethacrylate, poly isobutylmethacrylate, and methylmethacrylate polymers and copolymers. Suitable polymers are commercially available under the tradename Elvacite, which is marketed by Inland Leidy, a subsidiary of Du Pont. Specifically, Elvacite 2014 (a methylmethacrylate copolymer), Elvacite 2044 (a poly n-butylmethacrylate polymer), and Elvacite 2045 (a poly isobutylmethacrylate polymer) may be employed in the present invention.

The solution used for casting the blended cellulose nitrate films contains a mixture of a $C_1$–$C_4$ lower alkyl acetate and a $C_5$–$C_{10}$ higher alkyl acetate. The use of the mixed acetates is necessary so that the casting solution will spread uniformly upon the casting surface.

The ratio of the solvents in the solution is critical. The suitable volume ratio of casting solvents is about a 4:6 to about a 6:4 ratio of a lower and a higher alkyl acetate, preferably about a 9:11 to about 11:9 ratio and most preferably about a 1:1 ratio. The most preferred mixture of solvents is ethyl acetate/pentyl acetate. Large deviations in the ratios should be avoided. The reason is that the solvents do not spread at the same rate on water, and the solvent ratio represents the optimum mixture of solvents so that uniform spreading will result. If the ratios are altered substantially, one solvent may spread more quickly than the other causing a non-uniform film.

After a suitable solvent mixture is prepared, the cellulose nitrate and the methacrylate polymers are dissolved in the solvent mixture to prepare a casting solution. The casting solution will contain about two to about eight percent by weight of the cellulose nitrate polymer based on the total weight of the solvent and polymers in the solution, preferably about four to about seven percent, and most preferably about four to about five percent. The solution will also contain about one to about five percent by weight of a methacrylate polymer based upon the total weight of the solvents and polymers in the solution, preferably about two to about four percent and most preferably about 2.5 to about 3.0 percent. Generally, the greater the amount of polymers in the casting solution, the thicker the film will be. Conversely, the lower the amount of polyers, the thinner the film will be. However, if the amount of polymers is too low, such as below one percent by weight, the film will be too fragile to lift from the casting surface and will contain defects, such as holes. The polymer solution can be used immediately after preparation or stored in appropriate containers, such as teflon bottles, at room temperature.

Blended cellulose nitrate films may be cast from a polymer solution containing the methacrylate and cellulose nitrate polymers and a minor amount of other polymers which are compatible in film form with the cellulose nitrate and methylmethacrylate polymers and which can be dissolved in the polymer solution. When other polymers are mixed with the cellulose nitrate and the methacrylate polymers, the amount of the cellulose nitrate and the methacrylate polymers employed should be 80 percent or more by weight based upon the total weight of polymers dissolved in the casting solution. Examples of suitable polymers include styrene, acrylate ester and vinylidene chloride polymers and copolymers.

Before the polymeric solution is cast into films, it is preferred to filter the solution using microfilters and/or membranes. Filtration of the polymer solution before casting substantially reduces imperfections in the cast films. For example, the solution can be suction filtered through glass microfiber filters and then passed through one or more Millipore microfiltration membranes available from the Millipore Corporation. It is preferred to force the solution through a Millipore membrane having a pore size of 0.45 micron. In order to force the solution through the membrane, it is usually necessary to apply pressure. For example, a Millipore stainless 47 mm pressure holder operated at a pressure up to 100 psi argon can be used. The amount of pressure applied will depend upon the viscosity of the solution and the pore size of the membrane.

After filtration, the solution is cast on water at or near room temperature. As used herein, the term "water" includes aqueous solutions containing minor amounts (e.g. one percent or less by weight based upon the total weight of the solution) of organic solvents (e.g. lower weight alcohols) the presence of which does not adversely affect the properties of the films cast on the solution. The addition of such organic solvents may facilitate the removal of the film from the water's surface. The water is contained in any suitable walled container. For example, an appropriate container is an aluminum container having dimensions of 12"×12"×3". Preferably, the walls of the container are sloped outwardly at about a 20 degree incline to reduce reflected surface waves which can damage the film. Such waves are produced when the polymeric solution is placed on the water's surface or by air currents and external vibrations. Most preferably, the inside walls of the container are teflon coated so that films are less likely to stick to the sides of the container.

The polymeric solution is cast by depositing a drop of the polymer solution upon the water's surface. The solution usually spreads over the surface of the water in three seconds or less. The solution is allowed to stand until a sufficient amount of the solvent has evaporated to form a free-standing film. As used herein, the term "free-standing film" refers to a film that has a physically stable shape and is dimensionally stable on its casting surface and can be removed from the casting surface without having to be supported over the entire surface area of the film. The time of evaporation will depend upon the solvents used but generally is between 20 and 30 seconds and rarely more than about 60 seconds.

After the solvent has evaporated, the film is lifted from the liquid surface using any suitable means, such as a 2"×3", thin, aluminum plate having a 30 millimeter inner diameter hole in it and a handle on one end of the plate. When the aluminum plate touches the surface of the film, the film adheres to the aluminum plate and may readily be removed from the surface of the water.

The films of the instant invention are generally round, ultrathin, pinhole-free, uniform films having a diameter of about five to about six inches and a thickness of about 400 angstroms or less. As used herein, the term "ultrathin film" refers to a film having a thickness of about 400 angstroms or less and the term "pinhole-free film" refers to a film containing no macroscopic holes.

The films of this invention can be used as gas separation membranes and in end uses where a controlled release of drugs is needed.

The invention is illustrated by the following examples in which all percentages are by weight unless otherwise specified.

EXAMPLE 1

A solution containing five percent by weight of a cellulose nitrate polymer and about three percent by weight of a methylmethacrylate copolymer based upon the total weight of the solution was prepared by dissolving the polymers in a 1:1 by volume solvent mixture of ethyl acetate:pentyl acetate. The cellulose nitrate polymer had a molecular weight, $M_w$, of about 203,000 and an $M_n$ of about 61,000 and was obtained from the Hercules Corporation. The methylmethacrylate copolymer was Elvacite 2014, had a molecular weight, $M_w$, of about 85,000 and was obtained from Inland Leidy, a subsidiary of Du Pont.

After the polymer was dissolved, the polymer solution was suction filtered through Whatman GF/D glass microfiber filters having a particle retention size of 2.7 microns and available from Fisher Scientific and then passed through a Fluoropore polytetrafluoroethylene 0.45 micron membrane obtained from the Millipore Corporation. A Millipore stainless 47 millimeter pressure holder operated at a pressure sufficient to force the solution through the membrane was employed.

After filtration, a drop of the polymer solution was deposited on water contained in a square aluminum container measuring 12"×12"×3" and having teflon coated walls which were sloped outwardly at a 20 degree incline. The drop spread rapidly over the surface of the water to form a film having a diameter of about five inches. After 20 seconds, the film was lifted from the surface of the water using a 2"×3" aluminum plate with a 30 mm diameter hole in the middle and a handle at one end. The film was uniform and had a thickness of about 400 angstroms. Examination of the film disclosed no macroscopic pinholes or defects.

EXAMPLE 2

Example 1 was repeated except that the methacrylate polymer was Elvacite 2044, which is a poly n-butylmethacrylate polymer having a molecular weight, $M_w$, of about 200,000 and is available from Inland Leidy. The resulting film contained no macroscopic pinholes.

EXAMPLE 3

Example 1 was repeated except that the methacrylate polymer was Elvacite 2045, which is a poly isobutylmethacrylate polymer having a molecular weight, $M_w$, of about 200,000 and is available from Inland Leidy. Again no macroscopic defects were seen.

As can be seen, it is possible to blend different methacrylate polymers with cellulose nitrate to prepare blended cellulose nitrate films. In addition, the molecular weight of the different methacrylate polymers can vary.

What is claimed is:

1. A process for preparing a blended, cellulose nitrate polymer film having a thickness of about 400 angstroms or less and containing no macroscopic holes, wherein the process comprises:
   (a) preparing a casting solution containing a cellulose nitrate polymer at about the two to about the eight percent by weight level and a methacrylate polymer at about the one to about the five percent by weight level, based upon the total weight of the casting solution, in about a 4:6 to about a 6:4 by volume ratio of a $C_1$-$C_4$ lower alkyl and a $C_5$-$C_{10}$ higher alkyl acetate, respectively;
   (b) depositing the casting solution on water to form a free-standing film; and
   (c) removing the film from the water.

2. A process for preparing a blended cellulose nitrate polymer film having a thickness of about 400 angstroms or less and containing no macroscopic holes, wherein the process comprises:
   (a) preparing a casting solution containing a cellulose nitrate polymer at about the two to about the eight percent by weight level and a $C_1$-$C_8$ alkyl methacrylate polymer at about the one to about the five percent by weight level based upon the total weight of the casting solution in about a 4:6 to about a 6:4 by volume ratio of ethyl acetate:pentyl acetate;
   (b) depositing the casting solution on water to form a free-standing film; and
   (c) removing the film from the water.

3. The process of claim 1 wherein the methacrylate polymer is a $C_1$-$C_8$ alkyl methacrylate polymer.

4. The process of claims 1 or 2 wherein the methacrylate polymer is a methylmethacrylate polymer or copolymer, a poly n-butylmethacrylate polymer or a poly isobutylmethacrylate polymer.

5. The process of claim 1 wherein the lower alkyl acetate is ethyl acetate and the higher alkyl acetate is pentyl acetate.

6. A process for preparing a blended, cellulose nitrate polymer film having a thicknesses of about 400 angstroms or less and containing no macroscopic holes, wherein the process comprises:
   (a) preparing a casting solution containing a cellulose nitrate polymer at about the four to about the seven percent by weight level and a methylmethacrylate polymer or copolymer, a poly n-butylmethacrylate polymer or a poly isobutylmethacrylate polymer at about the two to about the four percent by weight level, based upon the total weight of the casting solution, in a about a 1:1 by volume ratio of ethyl acetate:pentyl acetate;
   (b) depositing the casting solution on water to form a free-standing film; and
   (c) removing the film from the water.

7. The process of claims 1 or 2 wherein the cellulose nitrate polymer is present at about the four to about the seven percent by weight level and the methacrylate polymer is present at about the two to about the four percent by weight level in the casting solution based upon the total weight of the casting solution.

8. The process of claims 1, 2 or 6 wherein the cellulose nitrate polymer is present at about the four to about the five percent by weight level and the methacrylate polymer is present at about the 2.5 to about the 3.0 by weight level based upon the total weight of the casting solution.

9. The process of claims 1 or 2 wherein the casting solution contains about a 9:11 to about a 11:9 by volume ratio of ethyl acetate:pentyl acetate.

10. The process of claim 9 wherein the casting solution contains about a 1:1 by volume ratio of ethyl acetate:pentyl acetate.

11. The process of claims 1, 2, 3, 5 or 6 wherein the polymers have molecular weights, $M_w$, greater than about 50,000.

12. The process of claim 11 wherein the molecular weight, $M_w$, of the cellulose nitrate polymer is greater than about 200,000 and the molecular weight, $M_w$, of the methacrylate polymer is greater than about 80,000.

13. The process of claims 1, 2 or 6 wherein the casting solution contains the cellulose nitrate and the methacrylate polymers at about the 80 to about the 100 percent by weight level and another polymer or polymers at about the 20 to about the 0 percent by weight level based upon the total weight of the polymers dissolved in the casting solution.

14. The process of claim 10 wherein the polymers have molecular weights, $M_w$, greater than about 50,000.

15. The process of claim 10 wherein the molecular weight, $M_w$, of the cellulose nitrate polymer is greater than about 200,000 and the molecular weight, $M_w$, of the methacrylate polymer is greater than about 80,000.

* * * * *